US010339442B2

(12) United States Patent
Min et al.

(10) Patent No.: US 10,339,442 B2
(45) Date of Patent: Jul. 2, 2019

(54) CORRECTED MEAN-COVARIANCE RBMS AND GENERAL HIGH-ORDER SEMI-RBMS FOR LARGE-SCALE COLLABORATIVE FILTERING AND PREDICTION

(71) Applicant: NEC Laboratories America, Inc., Princeton, NJ (US)

(72) Inventors: Renqiang Min, Princeton, NJ (US); Eric Cosatto, Red Bank, NJ (US)

(73) Assignee: NEC Corporation (JP)

( * ) Notice: Subject to any disclaimer, the term of this patent is extended or adjusted under 35 U.S.C. 154(b) by 601 days.

(21) Appl. No.: 15/088,312

(22) Filed: Apr. 1, 2016

(65) Prior Publication Data

US 2016/0300134 A1    Oct. 13, 2016

Related U.S. Application Data

(60) Provisional application No. 62/144,579, filed on Apr. 8, 2015.

(51) Int. Cl.
*G06N 3/04* (2006.01)

(52) U.S. Cl.
CPC ......... *G06N 3/0472* (2013.01); *G06N 3/0445* (2013.01)

(58) Field of Classification Search
CPC .......................... G06N 3/0472; G06N 3/0445
See application file for complete search history.

(56) References Cited

U.S. PATENT DOCUMENTS

2014/0310218 A1* 10/2014 Min ..................... G06N 3/08
                                                              706/16
2015/0227849 A1*  8/2015 Jaros .................... G06N 7/005
                                                              706/12

OTHER PUBLICATIONS

Liu et al, Distributed Parameter Estimation via Pseudo-likelihood, 2012, 29th international conference on Machine Learning, section 2.3 (Year: 2012).*

* cited by examiner

*Primary Examiner* — Austin Hicks
(74) *Attorney, Agent, or Firm* — Joseph Kolodka

(57) ABSTRACT

Systems and methods are disclosed for operating a Restricted Boltzmann Machine (RBM) by determining a corrected energy function of high-order semi-RBMs (hs-RBMs) without self-interaction; performing distributed pre-training of the hs-RBM; adjusting weights of the hs-RBM using contrastive divergence; generating predictions by Gibbs Sampling or by determining conditional probabilities with hidden units integrated out; and generating predictions.

4 Claims, 3 Drawing Sheets

CORRECTED MEAN-COVARIANCE RBMS AND GENERAL HIGH-ORDER SEMI-RBMS FOR LARGE-SCALE COLLABORATIVE FILTERING AND PREDICTION

This application claims priority to Provisional Application 62/144,579 filed Apr. 8, 2015. The present invention relates to systems and methods for operating Restricted Boltzmann Machine (RBM).

Restricted Boltzmann Machine (RBM) has been widely used for learning image, text, video, and audio representations due to its exact inference and fast learning, especially for pre-training a deep neural network or a deep generative model. It has also been successfully used for collaborative filtering to capture nonlinear interactions between user-rated items. Although RBM with enough hidden units can approximate any binary distribution as well as possible, it is hard to learn a traditional RBM with too many hidden units from limited sparse training data, and its representational efficiency can be greatly enhanced by including high-order hidden units. Previous research has tried using mean-covariance RBMs (mcRBMs) with both mean hidden units and covariance hidden units to model continuous data such as images and audios, and has achieved success based on weight factorization for reducing computational complexity. However, when mcRBM with factorized weights is directly applied to discrete data, either mean hidden units or covariance hidden units will be shut off due to the competitions and interference between them. Therefore, the enhanced power of mcRBM and our proposed semi-RBMs with hidden units modeling even high-order feature interactions cannot be directly utilized by many applications in discrete data completion and collaborative filtering.

Conventional systems either used RBM with only mean hidden units or covariance RBM with only covariance hidden units for modeling discrete data and collaborative filtering. There is no previous work that made mcRBM and high-order semi-RBM with both mean hidden units and high-order hidden units applicable to discrete data. In addition, conventional systems are focused on applying RBM to small or medium scale datasets, so new approaches need to be developed to apply RBM for large-scale data analytics.

SUMMARY

Systems and methods are disclosed for operating a Restricted Boltzmann Machine (RBM) by determining a corrected energy function of high-order semi-RBMs (hs-RBMs) without self-interaction; performing distributed pre-training of the hs-RBM; adjusting weights of the hs-RBM using contrastive divergence; generating predictions by Gibbs Sampling or by determining conditional probabilities with hidden units integrated out; and generating predictions.

Advantages of the system may include one or more of the following. The system is capable of modeling both the mean and high-order interactions between binary input features in the hs-RBM framework for the first time. The system can handle arbitrarily higher-order (3-order or more) interactions between features for discrete data matrix completion and collaborative filtering. The system can make predictions incorporating complicated high-order feature interactions in a probabilistic framework. The system can perform distributed optimization to deal with large-scale datasets with many features. The system can model arbitrarily higher-order (3-order or more) feature interactions between continuous data with a novel bounded energy function for data de-noising, completion, and classification.

BRIEF DESCRIPTION OF THE DRAWINGS

The disclosure will provide details in the following description of preferred embodiments with reference to the following figures wherein.

DESCRIPTION

A modeling framework using mcRBM and high-order semi-RBMs (hs-RBM) is disclosed that allows the deployment of mcRBM and high-order semi-RBMs on discrete data for large-scale matrix completion and collaborative filtering. The system is the first distributed optimization framework for training RBM and high-order semi-RBM, and high-order semi-RBM can be trained in a probabilistic discriminative way by integrating out hidden units. The framework can be readily used to improve the performance of mcRBM on continuous data.

Figure 1:
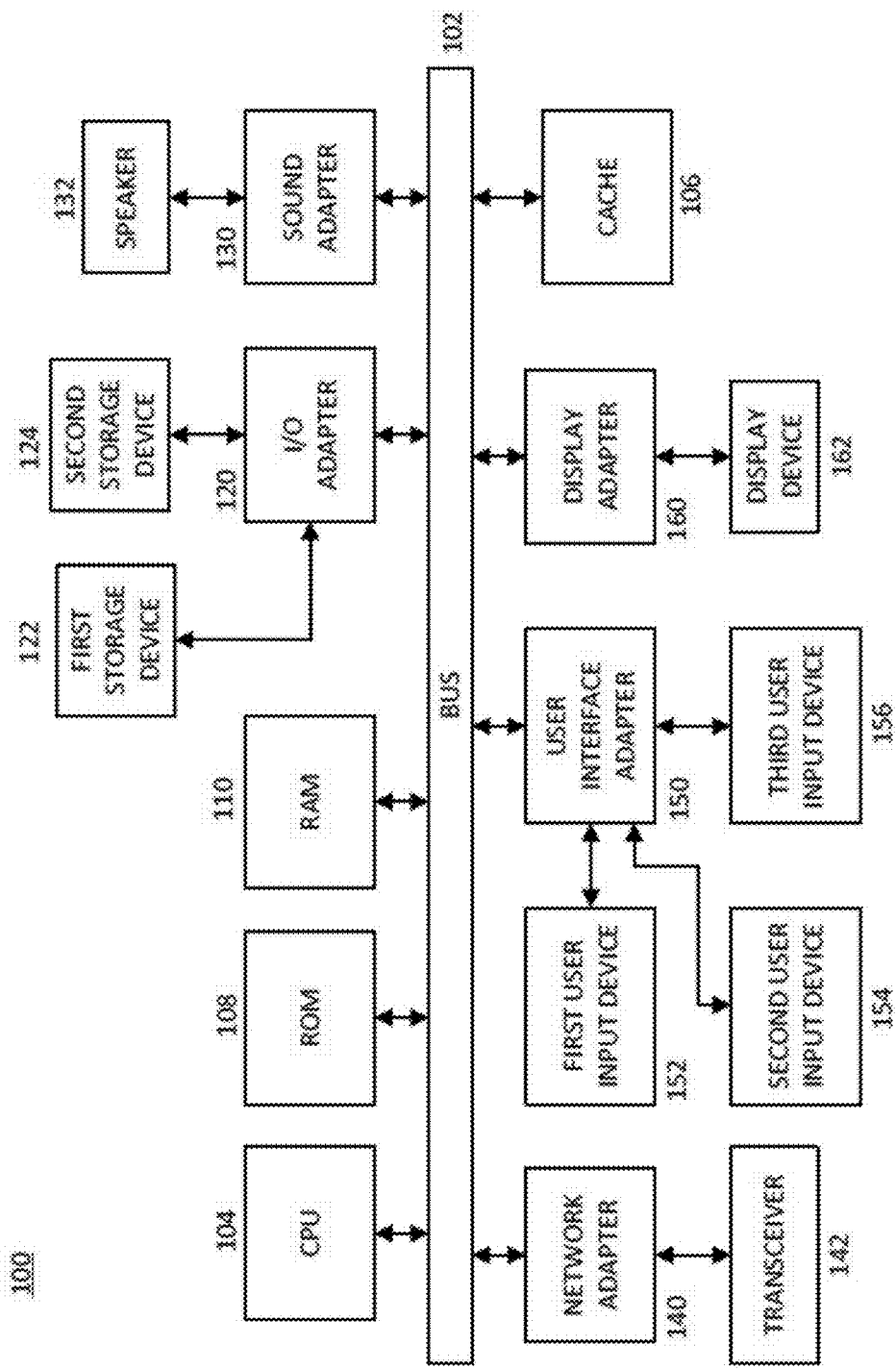
FIG. 1 shows an exemplary processing system to which the present principles may be applied, in accordance with an embodiment of the present principles.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
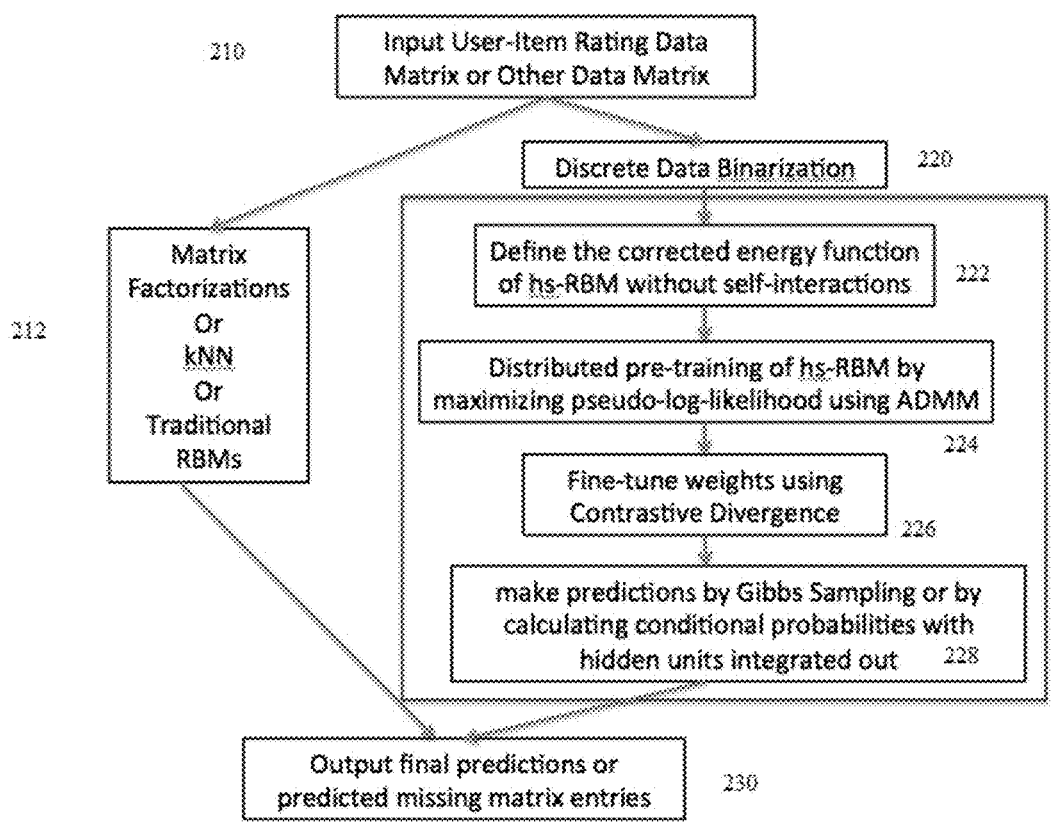
FIG. 2 shows a high level diagram of an exemplary process for training a Restricted Boltzmann machine, in accordance with an embodiment of the present principles.

Further, it is to be appreciated that processing system 100 may perform at least part of the methods described herein including, for example, at least part of method of FIG. 2.

Referring now to FIG. 2, a high level process

The process receives as inputs user-item rating data matrix or other suitable data matrix (210). Next, the process performs matrix factorizations for kNN or traditional RBMs. k-Nearest Neighbors technique (or k-NN for short) is a non-parametric method used for classification and regression. The process then defines corrected energy functions of hs-RBM without self-interactions (222). The process then performed distributed pre-training of hs-RBM by maximizing pseudo-log-likelihood using ADMM (224). The process also fine-tunes weights using contrastive divergence (226). The process then makes predictions by Gibbs sampling or by determining conditional probabilities with hidden units integrated out (228). From 212 or 228, the process generates final predictions or predicted missing matrix entries (230).

1) Energy Function Correction

A mcRBM is an undirected graphical model that defines a joint distribution over the configurations of visible units v and hidden units h by the following energy function, in which there is no connection between hidden units, $$E(v, h^g, h^m) = \frac{1}{2}\sum_f \left(\sum_i (v_i C_{if})^2 \left(\sum_k h_k w_{kf}\right) - \right.$$
$$\sum_i a_i v_i - \sum_k b_k h_k^g - \sum_{ij} v_i h_j^m w_{ij} - \sum_k c_k h_k^m$$

where $\hat{h}$ m and $\hat{h}$ g, respectively, denotes mean hidden units and covariance hidden nits. However, when this model is applied to binary data, $\hat{h}$ m and $\hat{h}$ g interfere with each other and only one of them will be active, because $v\hat{\,}_i$ 2 is equal to v_i for binary data and activating hAg also contributes to modeling the mean of all the visible units. We developed the following trick to modify the energy function of mcRBM for modeling binary data (other discrete data can be represented in a binary form), $$E(v, h^g, h^m) =$$
$$-\frac{1}{2}\sum_f \left(\left(\sum_i v_i C_{if}\right)^2 - \sum_i v_i^2 C_{if}^2\right)\left(\sum_k h_k w_{kf}\right) - \sum_{ij} v_i h_j^m w_{ij} + \text{bias\_terms}$$

Using the modified energy function, the two sets of hidden units will not interfere with each other. This trick is readily applicable for high-order semi-RBMs for which the subtracted energy term in the first line of the above energy function becomes \sum_o \sum_i v_i o P_{if} o, where o is the order of feature interactions under consideration.

The above correction term takes the same form when applied to hs-RBMs for modeling continuous data, although $v\hat{\,}_i$ o takes a different value from v_i in this case and the interference between mean hidden units and high-order hidden units is not as severe as in modeling binary data. In addition, for hs-RBMs with an odd number of feature interactions, we propose using the absolute value of the energy terms to make sure the final energy function is bounded below. For example, if we only model the mean and the third-order interactions between continuous feature values, we have the following energy function without correction (the correction term has the same form as in the above energy function for modeling binary data but lies within the absolute value operator below), $$E(v, h^{g^3}, h^m) = \frac{1}{3}\sum_f \left(\text{abs}\left(\sum_i v_i C_{if}\right)\right)^3 \left(\sum_k h_k^{g^3} w_{kf}\right) -$$
$$\sum_i a_i v_i - \sum_k b_k h_k^{g^3} - \sum_{ij} v_i h_j^m w_{ij} - \sum_k c_k h_k^m$$

2) Distributed Learning of hs-RBM Using ADMM When hs-RBM is trained on large-scale datasets with a huge number features, instead of using Contrastive Divergence to learn the parameters starting from random initializations, we maximize the pseudo-log-likelihood of the training data and use ADMM to split the computations across different visible units to learn parameters as a warm start, and then we use (persistent) contrastive divergence to fine-tune the parameters to approximately maximize the log-likelihood of the training data.

3) Discriminative Training of hs-RBM by Integrating Out Hidden Units

To make predictions using hs-RBM, we include another visible unit to denote the class label y. Then we calculate the conditional probability of p(y|x) by integrating out all the hidden units. Because there is no connection between hidden units, we will have a closed form solution. Then we use stochastic gradient descent to optimize the parameters by maximizing the sum of the log-conditional probabilities over the training data.

The most salient feature of an RBM is the energy function defined by it. RBMs, as the name suggests, are derived from Boltzmann Machines. Boltzmann Machines belongs to the category of Energy-based models, which tries to minimize the energy of the data they have to model. A Boltzmann Machine is very similar to Hopfield network, in which every state of the machine (values of the input units) has an energy associated with it.

$$E = -\frac{1}{2}\sum_{i,j} w_{ij} s_i s_j + \sum_i b_i s_i \quad (1)$$

Each unit is updated, either synchronously or asynchronously, based on the weighted sum of the input it receives from all the other units. If this sum is greater than a threshold, the unit becomes active. Eventually the network will converge to a local minimum in the energy space. Boltzmann Machines are very similar to Hopfield Networks, with the only exception that the units are turned on stochastically as opposed to deterministically in case of Hopfield networks. The energy function of a Boltzmann Machine (with hidden units or without hidden units) is exactly identical to that of Hopfield networks where some of the units can be visible units, and some can be latent hidden variables.

Restricted Boltzmann machines are a variant of the Boltzmann Machine with a restriction that there are no connections between visible units. So the energy function for an RBM becomes $$E(v, h) = -\sum_{i,j} w_{ij} v_i h_j - \sum_i a_i v_i - \sum_j b_j h_j \qquad (2)$$

This energy function suggests that each configuration (state of the hidden unit and visible unit) has an energy and consequently a probability associated with it. Obviously, the configurations with low energy are assigned high probability, and this can be expressed mathematically as $$p(v, h) \propto -E(v, h) \qquad (3)$$

$$p(v, h) = \frac{-E(v, h)}{Z} \qquad (4)$$

$$Z = \sum_{v,h} e^{-E(v,h)} \qquad (5)$$

where Z is called the partition function, or just the normalization function.

Each value of the parameters, weight and biases in this case defines a probability distribution over the visible and hidden units. It is noteworthy here that in RBM the hidden units are conditionally independent given the visible units, and the visible units are conditionally independent given the hidden units. This fact is the most salient feature of an RBM as far as the computational efficiency is concerned. Using this and equations 2-4, we can easily derive the two conditional probabilities:

$$P(h_j = 1/v) = \sigma\left(b_j + \sum_i v_i w_{ij}\right) \qquad (6)$$

$$P(v_i = 1/h) = \sigma\left(a_i + \sum_j h_j w_{ij}\right) \qquad (7)$$

Thus, given the visible units the system can sample the hidden units and vice versa. Sampling the visible units from the hidden units is required in the training procedure.

The system can also calculate the free energy of the visible units since the hidden units used are binary, which gives us the probability of the visible units, which in our case would be the data points.

$$F(v) = -\sum_i a_i v_i - \sum_j \log\left(1 + e^{b_j + \sum_{i,j} w_{ij} v_i}\right) \qquad (8)$$

Next the system can provide a simple example to show how an RBM can define a probability distribution, by considering a simple RBM with 2 visible binary units and 1 binary hidden unit. Consider the energy function in equation 2 and assume that there are no biases. The probability distribution of any RBM is characterized by its weight and biases, and the system can can see how by changing the weights the RBM assign different probabilities to different visible states. The addition of hidden units increases the capacity of an RBM to express complex joint probability distributions, allowing the RBM to work as a product of experts model.

Given that the RBM associates a probability with each configuration (data point), the straightforward way to train the network would be maximum likelihood. The parameters should be updated so that the entire set of training data points have high probability. The system can can use either free energy (probability of each data point exclusively) or the energy (probability of a data-point hidden unit combination) to maximize the log-likelihood of the observed dataset.

Given the energy term in 2 and the probabilities in 6-7, the derivative of the log probability, which will be used in gradient decent to update the weights can be written as:

$$\frac{\partial p(v)}{w_{ij}} = \langle v_i h_j \rangle_{data\_point} - \langle v_i h_j \rangle_{distribution} \qquad (9)$$

$$\frac{\partial p(v)}{w_{ij}} = v_i p(h_j = 1/v) - \langle v_i h_j \rangle_{distribution} \qquad (10)$$

The corresponding derivatives for the biases would be $$\frac{\partial p(v)}{a_i} = \langle v_i \rangle_{data\_point} - \langle v_i \rangle_{distribution} \qquad (11)$$

$$\frac{\partial p(v)}{b_j} = p(h_j = 1/v) - \langle h_j \rangle_{distribution} \qquad (12)$$

With the help of equations 6 it is very easy to compute the first term of all the derivative, using the probabilities instead of the sampled binary value for the hidden units, and the observed data as the visible units. This term is also termed as positive statistics, as it tries to increase the probability of the observed data point. However the second term contains an expectation over the whole distribution defined by the RBM. This is called negative statistics, as it tried to decrease the probability of the samples generated form the current distribution. This means that samples from the exact distribution defined the RBM, and it is in the way this sample is generated that leads to different algorithms for training RBMs.

Equation 9 is very intuitive to understand, the learning tries to decrease the energy of the given data point, and increase the overall energy of all the data points defined by the RBM distribution. Eventually, the learning will stop when the RBM has updated it parameters in such a way, that the distribution defined by it is very close to the distribution of the data it is trying to model.

Next, sampling methods are discussed:

1. Gibbs Sampling:

One way to get a sample from a joint distribution is Gibbs sampling. The idea is to start from a random state $v_1$ (visible units in our case), and using equations 6 and 7 an infinite number of time to reach the state $v_{inf}$. If this is done for a very long time, then $v_{inf}$ would be an accurate sample of the distribution. Even though theoretically robust, this procedure is not practical at all, because the system needs to run the chain for a very long time to get the exact sample each time needed to update the parameters.

2. Contrastive Divergence:

This is the most commonly used procedure for sampling the negative particles. The procedure is very simple, instead of generating the exact sample from the distribution by running the chain for a long time, this procedure uses the samples generated from the first step of the chain itself. The samples $v_1$ and $h_1$ are used to compute the negative statistics. It is important to note here that the chain is always started from the data point, unlike the Gibbs Sampling when the chain could be started from any random input point. This simple strategy makes this algorithm very computationally efficient. [1] gives an intuitive as well as mathematical explanation why such an sampling would work. The idea is that the one-step reconstruction would be closer to the data distribution than the data itself (since running the chain for an infinite time leads to the data distribution), and so treating this sample as negative particle would also serve our purpose of increasing the expected energy of the samples from the distribution. From the above explanation it is clear that running the chain for n steps instead of one step would provide even better samples, as the sample become more and more close to the data distribution. The algorithm, which obtains the negative sample by running the chain for one step is called CD-1, and the one that runs the algorithm for n chains is called CD-n.

3. Persistent Contrastive Divergence:

In case of Contrastive Divergence (CD-1 or CD-n), each time the network sees a new data point, it starts a Markov chain from that data point itself. Here, instead of doing that, in PCD the network starts a Markov chain form a random point, and maintains (persists) this chain throughout the algorithm. This means that each time, the network wants to generate negative sample to update the parameters, it runs this chain one time (or n times for PCD-n) to sample a particle. The idea is that if the learning rate of the parameters are slow enough, then eventually the samples would be accurate. In the extreme case, lets consider that the learning rate is zero, then this is exactly the same as performing the infinite chain Gibbs sampling, since the parameters do not change at all. This is theoretically more sound than Contrastive Divergence, as it generates more accurate samples and there is not much computational overhead apart from maintaining the states of the chains. A variant of PCD available in the literature is Fast PCD, in which the negative samples are obtained using the original weights of the RBM, as well as an additional set of weights which are updated using a higher (fast) learning rate.

Even though RBMs were introduced to model binary data, they have been successfully used to model continuous data as well with binary hidden units. Gaussian RBM is one such model which can capture the distribution of Gaussian units. The energy for the Gaussian RBM is:

$$E(v, h) = -\sum_{i,j} \frac{v_i}{\sigma_i} h_j w_{ij} - \sum_i \frac{(v_i - a_i)^2}{2\sigma_i^2} - \sum_j b_j h_j \quad (13)$$

For simplicity the variance of the visible units is set to be 1, leading to the energy function:

$$E(v, h) = -\sum_{i,j} v_i h_j w_{ij} - \sum_i \frac{(v_i - a_i)^2}{2} - \sum_j b_j h_j \quad (14)$$

Using this energy, the activation probability of hidden units as well as the conditional probability distribution of the visible units given the hidden units can be determined in a similar way to binary units. The only difference being that the visible units can now take an infinite number of real values instead of just binary values. It turns out that the visible units are conditionally independent and Gaussian distributed themselves:

$$p(v_i/h) = N\left(\sum_j h_j w_{ij}, 1\right) \quad (15)$$

Rectified linear units are used for visible points to sample the visible units. Equations 13 and 14 can be used with of the sampling techniques to generate negative particles for training the network. One key factor to be remembered when using Gaussian RBM is that the input has to be normalized before training. This was not necessary for binary RBM, but for Gaussian RBM the data should be normalized to mean 0 and variance 1.

Gaussian RBMs are very difficult to train using binary hidden units. This is because unlike binary data, continuous valued data lie in a much larger space (for images, each unit can take 255 different value, for binary each point can only take only 2). One obvious problem with the Gaussian RBM is that given the hidden units, the visible units are assumed to be conditionally independent, meaning it tries to reconstruct the visible units independently without using the abundant covariance information present in all datasets. The knowledge of the covariance information reduces the complexity of the input space where the visible units could lie, thereby helping RBMs to model the distribution. Gating the interaction between the visible units leads to the energy function:

$$E(v, h) = \frac{1}{2} \sum_{i,j,k} v_i v_j h_k w_{ijk} - \sum_i a_i v_i - \sum_k b_k h_k \quad (16)$$

In case of images nearby pixels are always highly correlated, but presence of an edge or occlusion would make these pixels different. It is this flexibility that the above network is able to achieve, leading to multiple covariances of the dataset. Every state of the hidden units defines a covariance matrix. This type of RBMs are called Covariance RBM (cRBM).

To take advantage of both the Gaussian RBM (which provides the mean) and the cRBM, mcRBM uses an energy function that includes both the term:

$$E(v, h^g, h^m) = \quad (17)$$
$$\frac{1}{2} \sum_{i,j,k} v_i v_j h_k^g w_{ijk} - \sum_i a_i v_i - \sum_k b_k h_k^g - \sum_{ij} v_i h_j^m w_{ij} - \sum_k c_k h_k^m$$

In equations 16 and 17, each hidden unit modulate the interaction between each pair of pixels leading to a large number of parameters in $w_{ijk}$ to be tuned. However, most of the real world data for structured and do not need such explicit modulation between each pair of visible units. To reduce this complexity, [2] introduced factors approach to approximate the weight $w_{ijk}$.

$$w_{ijk} = \sum_f C_{if} C_{jf} P_{kf} \qquad (18)$$

The energy function can now be written as $$E(v, h^g, h^m) = \frac{1}{2} \sum_f \left( \sum_i v_i C_{if} \right)^2 \left( \sum_k h_k w_{kf} \right) - \qquad (19)$$

$$\sum_i a_i v_i - \sum_k b_k h_k^g - \sum_{ij} v_i h_j^m w_{ij} - \sum_k c_k h_k^m$$

Figure 3:
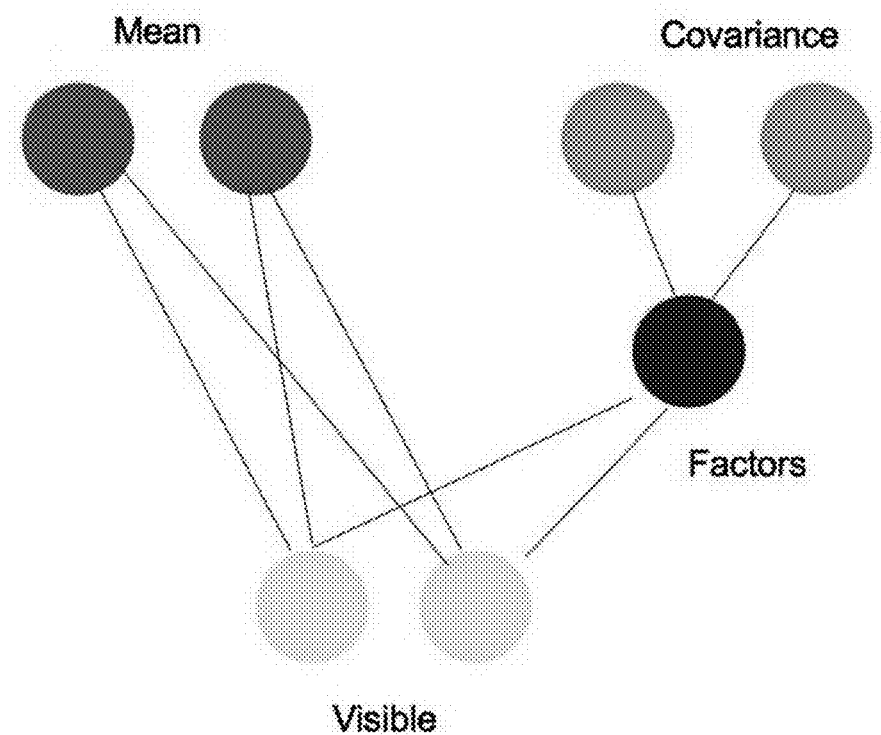
FIG. 3 shows an exemplary structure of factored mcRBM with 2 mean hidden and 2 covariance hidden units.

Using this energy function, the system can derive the activation probabilities of the hidden units, as well the respective gradients for training the network. FIG. 3 explains the structure of this factored mcRBM, the hidden units on the left are called mean hidden units and those on the right are called covariance hidden units.

The energy function can also be used to sample the negative particles given the hidden units, but this requires computing the inverse of a matrix which is computationally very expensive for each training update. To get over this problem, [10] defines a sampling method called Hybrid Monte Carlo sampling to generate the negative particles. The is that given a starting point $P_0$ and an energy function, the sampler starts at $P_0$ and moves with randomly chosen velocity along the opposite direction of gradient of the energy function to reach a point $P_n$ with low energy. This is similar to the concept of CD (or PCD), where an attempt is make to reach as close as possible to the actual model distribution. The term n is specified by the leap-frog steps, which can be 20.

To sample a visible point, the free energy of the samples can be used instead of the joint energy of the samples and hidden units. The free energy can be easily computed for binary hidden units can be obtained in a similar way to equation 8

Training mcRBMs is very tricky, because they depend on initialization of the factor weights (P and C), their learning rates and normalization of P and C.

P is initialized and constrained to be positive. According to equation 19, if any value of P is allowed to be negative, the HMC can obtain extreme negative or positive value for the negative particles, since they would have very low energy (close to â€" inf). This is a concave quadratic function to sample a point with low energy from it. This is indeed the reality with mcRBM and so it is very important to satisfy this constraint.

The biases of the covariance hidden units are all assigned positive values, which makes the units to be ON most of the time. The only way to make a hidden unit off is when the factors connected to the hidden units provide large input. This is multiplied with the negative value of P, and can turn OFF the hidden unit. This can be thought of a constraint gating, where the violation of a constraint leads to turning off the hidden units.

Both the P and C matrix are normalized to have unit norm along their columns. Along with this, the data is also normalized along its length. The normalization of data and C leads to the model being invariant to the magnitude of the input point, rather it only depends on the cosine of the angle between the input and P filters. Normalization of P does not influence the performance. This normalization of the input data, changes the energy function which has to be taken care of while computing its gradient during HMC.

Learning rate for C is assumed to be very low. This is required because by empirical evaluation a comparable learning rate to P leads to instability in the performance.

The input data is preprocessed using PCA whitening to remove the noise present in the data. Whitening helps to get rid of the strong pairwise correlations in the data, which are not much informative like correlation between adjacent pixels in an image. This step also reduces the dimensionality of the data points, thereby helping the algorithm computationally. It is a crucial step, because working on the raw data leads to the network modeling noise more than the important features.

The P matrix is often initialized using a topographical mapping, which leads to pooling of the factors. This means that nearby factors (in a topographical sense) capture similar features. To understand topographical mapping, think of $n^2$ hidden units arranged on n×n grid at layer 1, and similary the $m^2$ factors arranged on a m×m grid at layer 0. Each hidden unit is now only connected to its closest few factors in the lower layer.

These are some of the precautions and initialization tricks that have to be taken care of while using an mcRBM. With these the mcRBM can detect interesting second-order correlations present in the data, leading to better modeling of data.

The mcRBMs successfully captures second-order correlations in the data. If the data would be purely Gaussian, the highest correlation present would be second-order. But real world data are not purely Gaussian, so even higher order correlations process is needed. To capture third order correlations, the energy function in equation 19 is modified as follows:

$$E(v, h^{g3}, h^m) = \frac{1}{3} \sum_f \left( \text{abs}\left(\sum_i v_i C_{if}\right) \right)^3 \left( \sum_k h_k^{g3} w_{kf} \right) - \qquad (20)$$

$$\sum_i a_i v_i - \sum_k b_k h_k^{g3} - \sum_{ij} v_i h_j^m w_{ij} - \sum_k c_k h_k^m$$

The process takes the absolute value of the C filter outputs and constrains P to ensure that the HMC does not give extreme values as negative particles. The absolute value has to be considered when computing the gradient during HMC. The natural thing would be now to combine the second order and third order terms.

One extension of a simple RBM is to introduce lateral connections between the visible units to capture second order interactions in the data. The idea is that if two units are highly correlated, then this correlation can be captured by the lateral weights, and the RBM weights can capture more interesting features than strong pairwise correlations. [14] The energy function of such a Boltzmann machine, also termed as Semi-Restricted Boltzmann Machines with lateral connection can be written as:

$$E(v, h) = -\sum_{i,k} w_{ik} v_i h_k - \sum_i a_i v_i - \sum_k b_k h_k - \sum_{ij} v_i v_j L_{ij} \qquad (21)$$

where L defines the lateral weights between the visible units constrained with $L_{ii}=0$ In such a network, the hidden units are still conditionally independent given the visible units, but the visible units are no longer conditionally independent. So, the visible units cannot be sampled according to equation 7, and the system can apply mean-field reconstruction of the visible units. This is a computational disadvantage on the regular RBM, where the visible units can be sampled in parallel. Using the energy function above:

$$\alpha_i(n) = \sigma\left(a_i + \sum_k h_k w_{ik} + \sum_j v_i(n-1)L_{ij}\right) \quad (22)$$

$$v_i(n) = \lambda v_i(n-1) + (1-\lambda)\alpha_i(n) \quad (23)$$

where $\lambda$ is the parameter for mean-filed reconstruction. This parameter can be 0.2, however, the choice of lambda did not seems to have a great impact on the performance. and used the above equation from n=1 to n=10, assigned v(0) to be either the data (CD) or the persistent fantasy particle (PCD)

The $L_{ij}$ weight vector indeed captures the true covariance matrix (approximately) of the dataset. There is also a difference in the quality of filters obtained as a result of lateral connections, whereby the filters appear to extract more interesting features than filters without lateral connections which are active for a small blob of input space (like when modeling images). However, if the hidden units are high enough then all the good features are captured without lateral connections as well.

Lateral connections is one way to capture higher order correlations in binary data. However, it provides only one correlation matrix for the dataset. The idea of cRBM, described above was first introduced for binary data [2], claiming that it can capture better features than a simple RBM. Unfortunately, there has been no possible attempt to use this modification in improving the performance of the binary RBM. The energy function of equation 16 can be used for binary data.

This is indeed a better model for binary data, as it allows hidden units to gate the interactions between visible units. It is to be noted here that the visible units are no longer independent given the hidden units, so Gibbs sampling cannot be used to compute all the visible unit activations simultaneously. Instead Gibbs sampling is done sequentially for all the dimensions of the visible units. This can be very computationally expensive for inputs with relatively high dimension (even 500). To avoid this, approximations in the form of mean field updates is used to get the samples. This is not as accurate as exact Gibbs sampling but fulfills our purpose most of the time. Mean field in a similar way to the one used in lateral connections with $\lambda$ 0.2 can be used with 10 mean field updates for each sampling. Similar to GRBM, the cRBM is extended to mcRBM for binary data, leading to the energy functions 24 (which is same as 17)

$$E(v, h^g, h^m) = \frac{1}{2}\sum_{i,j,k} v_i v_j h_k^g w_{ijk} - \sum_{ij} v_i h_j^m w_{ij} + \text{bias\_terms} \quad (24)$$

This contains both the terms for modeling the mean as well as the covariance of the dataset. However, this does not perform better than a simple RBM in practice. This is because the expansion of the left terms in equation 24 contains terms like $v_i^2 h_k^g w_{iik}$, which are also present in the mean side $v_i h_k^m w_i k$, because $v_i^2 = v_i$ for binary data. This leads to some kind of competition between the mean and covariance hidden units depending on their learning rates, leading to instability in learning. Similarly, it can be observed that equation 16 contains terms for both mean and covariance information, but in this case a hidden unit is made to model both this information simultaneously. To get rid of these issues, the energy function is modified to make sure that mean and covariance hidden units do not overlap with each other. The corrected mcRBM with the energy function is as follows:

$$E(v, h^g, h^m) = -\frac{1}{2}\sum_f \left(\left(\sum_i v_i C_{if}\right)^2 - \sum_i v_i^2 Cif^2\right)\left(\sum_k h_k w_{kf}\right) - \sum_{ij} v_i h_j^m w_{ij} + \text{bias\_terms} \quad (25)$$

This is exactly same to ensuring that in, $w_{iik}=0\ \forall i$. This ensures that the two hidden units model the mean and covariance information respectively.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention.

Those skilled in the art could implement various other feature combinations without departing from the scope and spirit of the invention.

What is claimed is:

1. In a system comprising a processor and a memory that includes a plurality of components that are executable by the processor, the plurality of components having a data receiver component that receives training data, and a training component that trains a generative stochastic artificial neural network including hidden units u and visible units v that can learn a probability distribution over its set of inputs, said system operating according to a method comprising the following computer-executable acts:

determining a corrected energy function of high-order semi-Restricted Boltzmann Machines (hs-RBMs), said determination made without self-interaction;

performing distributed pre-training of the hs-RBM by a pseudo-log likelihood method using alternating direction of multipliers (ADMM);

adjusting weights of the hs-RBM using contrastive divergence;

generating predictions by Gibbs Sampling or by determining conditional probabilities with hidden units integrated out; and outputting the predictions so generated;

wherein the training includes a mean-covariance RBM (mcRBM) that defines a joint distribution over configurations of the visible units u and the hidden units h by an energy function in which there is no connection between hidden units and the energy function is defined by the following relationship:

$$E(v, h^g, h^m) = \frac{1}{2}\sum_f \left(\sum_i v_i C_{if}\right)^2 \left(\sum_k h_k w_{kf}\right) - \sum_i a_i v_i - \sum_k b_k h_k^g - \sum_{ij} v_i h_j^m w_{ij} - \sum_k c_k h_k^m$$

where $h^m$ and $h^g$, respectively, denotes mean hidden units and covariance hidden units.

2. The method of claim 1, further comprising modifying the energy function of the mcRBM for modeling binary data as:

$$E(v, h^g, h^m) = -\frac{1}{2}\sum_f \left(\left(\sum_i v_i C_{if}\right)^2 - \sum_i v_i^2 C_{if}^2\right)\left(\sum_k h_k w_{kf}\right) - \sum_{ij} v_i h_j^m w_{ij} + \text{bias\_terms}.$$

3. The method of claim 2, further comprising assigning an absolute value of the energy terms such that a final energy function is bounded for hs-RBMs with an odd number of feature interactions.

4. The method of claim 3, further comprising maximizing pseudo-log-likelihood of training data and alternating direction of multipliers methodology to split computations across different visible units such that parameters as a warm start are learned and using contrastive divergence to tune the parameters to change the log-likelihood of the training data.

* * * * *